3,372,128
NOVEL CATALYST COMPOSITION
Shozo Maeda, Nishinomiya-shi, Ken Ito and Teruya Nishida, Toyonaka-shi, and Takashi Tamura, Osaka, Japan, assignors to Sumitomo Chemical Company, Ltd., Osaka, Japan, a corporation of Japan
No Drawing. Filed Jan. 23, 1964, Ser. No. 339,617
Claims priority, application Japan, Jan. 25, 1963, 38/3,691
2 Claims. (Cl. 252—437)

The present invention relates to an improved catalyst used in a process for the vapor phase catalytic oxidation of olefins to useful oxygenated hydrocarbon compounds in good yield, and to the method for producing the same. More particularly, it relates to an improved catalyst consisting of bismuth molybdate or bismuth phosphomolybdate and of diatomaceous earth as support, and to the method for producing the same.

Bismuth molybdate and bismuth phosphomolybdate catalysts are known as a useful catalyst for the production of unsaturated carbonyl compounds and carboxylic acids from olefins and unsaturated carbonyl compounds respectively, and of unsaturated nitriles by the reaction of olefins, ammonia and oxygen. (Cf. Japanese Patent Publication Sho 35/10308, Sho 36/3563, Sho 36/5870, and Sho 37/8568.

The specifications of the above patents disclose that silica, especially that formed from aqueous colloidal silica sol is preferably used as a catalyst support and that other chemically inactive substances, such as alundum, silicon carbide, alumina-silica, alumina, and titanium dioxide, can be used. But the catalysts supported on these carriers are not yet satisfactory, as they have such drawbacks as to cause unfavorably complete oxidation reaction of olefins or have low activity and selectivity to desired products.

Thus, an object of the present invention is to provide an improved catalyst which makes the process more advantageous and more economical from the industrial viewpoint to manufacture unsaturated carbonyl compounds by the catalyst oxidation of olefins, e.g., acrolein and methacrolein from propylene and isobutylene, respectively, with high conversion of olefins and high selectivity to unsaturated carbonyl compounds, by controlling complete oxidation of olefins. Another object is to provide an improved catalyst with the use of industrially low-priced and easily obtainable diatomaceous earth as a catalyst support. Still another object is to provide a method for producing the catalyst as mentioned-above. Other objects would be apparent from the following description.

By use of the catalyst, containing diatomaceous earth as a support, obtained according to the present invention, olefins, e.g., can be converted to the corresponding carbonyl compound, in good yield, i.e., with high conversion of olefins and high selectivity to the desired products.

Besides, in vapor phase catalytic oxidation of olefin, reaction is generally controlled by introducing water (in the form of vapor) into the reaction system, but the catalyst according to the present invention, has such an advantageous property that it enables to greatly reduce water (in the form of vapor) content in the reaction mixture. The saving of water involves the economy of heat, and leads to less expensive investment cost for the equipment.

The present catalyst is suitably applied to the oxidation of the lower alkenes (3 to 8 carbon atoms), but higher alkenes may also be utilized with good efficacy. Among the various olefinic compounds which may be utilized in accordance with the invention, illustrative are propylene, butene-1, butene-2, isobutylene, pentene-1, pentene-2, 3-methyl-butene-1,2-methyl-butene-2, hexene-1, hexene-2, 4-methyl-pentene-1, 3,3-dimethyl-butene-1, 4-methyl-pentene-2, octene-1, cyclopentene, cyclohexene and 3-methyl-cyclohexene. The present catalyst is preferably applicable to the production of acrolein and methacrolein from propylene and isobutylene, respectively.

According to the present invention, diatomaceous earth such as Celite is used preferably in powder form of 50–200 mesh, preferably that of about 100 mesh. The diatomaceous earth may also be employed, being added with other support such as silica. The active component of this catalyst may be the same as described in the aforementioned patents; namely in the empirical formula of $Bi_a P_b mo_c O_d$, $a$ may be 0.5 to 18, $b$ may be 0 to 5, $c$ is 12 and $d$ may be 36 to 76. Any amount of diatomaceous earth may be contained as a support, but it is desirable that the catalysts are prepared so as to contain diatomaceous earth of 10–75% by weight, preferably 25–50%, based upon the total weight of the catalyst.

The catalyst may be prepared by any of the various methods of catalyst preparation known to those skilled in the art. The raw materials of the active components of the catalyst may be allowed to react to produce the suspension of yellow precipitate, then diatomaceous earth is added to the suspension, or the suspension of yellow precipitate may be produced on the diatomaceous earth. If necessary, the mixture may be concentrated by heating, then the mixture is molded. The mixture may be dried and tableted or may be kneaded and extruded as pellets by a known method and then dried. Thereafter the catalysts are calcined.

In the use of the present catalyst, the reaction conditions are not much different from those disclosed in the aforementioned patents. In the case applied to the oxidation of olefins to unsaturated carbonyl compounds, the temperatures in the range of 300° to 600° C., preferably 400° to 500° C., the space velicity [liters of raw material gas mixture (at 0° C., 1 atm.) supplied per hour per liter of catalyst] in the range of 240 hr.$^{-1}$ to 5,400 hr.$^{-1}$, the mol ratio of oxygen to olefin between 5:1 and 0.5:1, may be advantageously employed. The oxygen source may be either oxygen or air.

It is preferred that the mol ratio of water to olefin is between 1:1 and 25:1, somewhat higher water content being desirable in the case of isobutylene oxidation.

It is (1) generally preferred to operate at or near atmospheric pressure though (2) pressures other than atmospheric may be employed.

The following examples will be given in order to further explain the present invention, but not to limit it.

*Example 1*

167 g. of ammonium dimolybdate and 380 cc. of nitric acid were dissolved in one liter of water, to which 185 g. of Celite and 9.6 g. of phosphoric acid were added and stirred. Then bismuth nitrate solution of 143 g. of bismuth, 510 cc. of nitric acid and 100 cc. of water, was added into the mixture with stirring, to make the yellow precipitate on the particles of Celite. Thereafter, the mixture was charged into an evaporating dish set on a water bath and the mixture was concentrated by evaporation for 3 hours.

After being dried further in an open dryer at 80° C. for 24 hours, the dried mass was tableted and calcined at 500° C. for 12 hours, in order to manufacture the catalyst.

Example 2

In the following Tables 1 and 2, the results of the reaction tests by use of this catalyst and others, are given to show the comparison between a catalyst supported on Celite (present invention) and other catalysts supported on other catalyst supports.

As to the reaction conditions such as reaction mol ratio and reaction temperature, the most suitable ones for each catalyst support were adopted.

TABLE I

| Kind of support | Space velocity (hr.$^{-1}$) | Mol ratio propylene: air:water | Reaction temperature (°C.) | Conversion of propylene, percent | Selectivity for acrolein, percent |
|---|---|---|---|---|---|
| Celite | 2,000 | 1:8:3 | 480 | 67.2 | 81.1 |
| Acid clay | 1,500 | 1:7:8 | 410 | 70.4 | 51.1 |
| Pumice | 1,300 | 1:6:4 | 445 | 65.1 | 63.3 |
| Silica gel | 1,500 | 1:5:10 | 410 | 66.2 | 49.9 |

NOTE.—Conversion of propylene=Mols of propylene in feed-Mols of propylene in effluent÷Mols of propylene in feed×100 (percent). Selectivity for acrolein=Mols of propylene converted to acrolein÷Mols of propylene in feed-Mols of propylene in effluent×100 (percent).

TABLE 2

| Kind of support | Space velocity, (hr.$^{-1}$) | Mol ratio isobutylene: air:water | Reaction temperature, (°C.) | Conversion of isobutylene, (percent) | Selectivity for methacrolein, (percent) |
|---|---|---|---|---|---|
| Celite | 1,500 | 1:5:10 | 375 | 50.1 | 71.4 |
| Silica gel | 1,500 | 1:5:10 | 350 | 38.6 | 41.2 |

What we claim is:
1. A catalyst which consists essentially of a member selected from bismuthmolybdate and bismuthphosphomolybdate, supported on 10–75% by weight, based upon the total weight of the catalyst, of diatomaceous earth.
2. A catalyst according to claim 1 wherein the diatomaceous earth is present approximately 25–50% by weight based upon the total weight of the catalyst.

References Cited

UNITED STATES PATENTS

| | | | |
|---|---|---|---|
| 2,470,190 | 5/1949 | Schmerling | 252—437 X |
| 2,881,212 | 4/1959 | Idol et al. | 252—437 X |
| 2,941,007 | 6/1960 | Callahan et al. | 252—437 X |
| 3,280,167 | 10/1966 | Schwarzer et al. | 252—437 |

DANIEL E. WYMAN, *Primary Examiner.*

OSCAR R. VERTIZ, PATRICK P. GARVIN, *Examiners.*

A. J. GRIEF, L. G. XIARHOS, *Assistant Examiners.*